United States Patent [19]

Hornback

[11] Patent Number: 4,542,326
[45] Date of Patent: Sep. 17, 1985

[54] AUTOMATIC ANTENNA POSITIONING SYSTEM

[75] Inventor: Donald L. Hornback, St. Joseph, Mich.

[73] Assignee: Heath Company, St. Joseph, Mich.

[21] Appl. No.: 433,568

[22] Filed: Oct. 8, 1982

[51] Int. Cl.⁴ .............................................. G05B 23/02
[52] U.S. Cl. ...................................... 318/565; 343/7.4
[58] Field of Search ...................... 343/7.4, 7 AG, 426, 343/422, 359; 318/663, 664, 672, 673, 565, 590

[56] References Cited

U.S. PATENT DOCUMENTS

| | | |
|---|---|---|
| 2,794,162 | 5/1957 | Lifsey . |
| 2,950,478 | 8/1960 | Reppert ................................ 343/426 |
| 2,989,680 | 6/1961 | Weiser et al. . |
| 3,200,314 | 8/1965 | Iroler . |
| 3,229,176 | 1/1966 | Curll, Jr. et al. . |
| 3,248,730 | 4/1966 | Neumeyer . |
| 3,448,360 | 6/1969 | Pohl . |
| 3,671,969 | 6/1972 | Basman ................................ 343/426 |
| 3,826,964 | 7/1974 | Byrne . |
| 3,886,555 | 5/1975 | Royal ................................ 343/7.4 X |
| 3,976,999 | 8/1976 | Moore ............................... 343/7.4 X |
| 4,030,099 | 6/1977 | Valenti .............................. 343/7.4 X |
| 4,117,386 | 9/1978 | Cohen .................................. 318/664 |
| 4,247,857 | 1/1981 | Wilcke ................................. 343/426 |
| 4,263,539 | 4/1981 | Barton . |

OTHER PUBLICATIONS

"F3870 MicroMachine ™ 2, Fairchild Microcomputer Family", published by Fairchild Camera and Instrument Corporation, 1977.

*Primary Examiner*—William M. Shoop
*Assistant Examiner*—Patrick Keane

[57] ABSTRACT

A microprocessor-controlled antenna positioning system for automatically steering a rotatable antenna in the direction of a source of radiated signals is disclosed. The present invention, which is particularly adapted for use in a television receiver or a subscription television receiver (STV) decoder, automatically seeks the best signal when a new channel or frequency is selected, remembers that preferred antenna position, and will return to it whenever that channel or frequency is subsequently selected. A large number of desired antenna headings may be stored in memory for subsequent use and the computer-selected antenna heading may be modified to avoid TV ghosts or to select a second station on the same channel. The system determines optimum antenna direction by sweeping the antenna through a full 360° circle, keeping track of the width of receivable signal lobes. Upon completing the sweep, it selects the widest transmitted signal lobe at the desired frequency and positions the antenna in the center of that lobe. In addition, an intermediate frequency automatic gain control (IFAGC) voltage representing received signal strength is compared with a predetermined signal level established by the viewer for insuring that received signal strength is sufficient for presentation of a minimally acceptable video image. Accurate positioning is insured by incrementally rotationally displacing the receiving antenna, sequentially and repetitively comparing the new position with a programmed, or stored, position by means of a control signal feedback loop, and generating antenna positioning commands in response thereto.

10 Claims, 3 Drawing Figures

AUTOMATIC ANTENNA POSITIONING SYSTEM

BACKGROUND OF THE INVENTION

This invention generally relates to rotary antenna positioning systems and more specifically is directed to a microprocessor controlled automatic antenna positioning system in which transmitter location and received signal strength are used in optimally positioning the antenna.

Rotary antenna positioning systems are used in various communications systems, most popularly in conventional television and radio receivers. These systems may be either manual and under the direct control of the user, or viewer, or they may be automatic in the sense that the antenna is positioned automatically in response to the station, or channel, selected. Automatic antenna positioning is desirable since the untrained user generally finds it difficult to optimally position the antenna for receiving the strongest signal. Transmitting antenna sidelobe radiation, the presence of widely located stations transmitting the same channel, or frequency, and various other factors beyond the viewer's control frequently make accurate manual antenna positioning difficult, if not impossible.

The performance of automatic antenna positioning systems is frequently degraded by electric motor interference with the reception and detection of the incoming signal. In addition, in conventional rotary antenna positioning systems the antenna drive system is coupled to the channel selector and tuning systems by means of a large number of electromechanical relays and switches which not only are electrically noisy, but also generally have low reliability.

From the discussion of the aforementioned problems, it can be seen that the orientation of the receiving antenna is a critical factor in optimizing the reception of the transmitted signals. These problems may be compounded by the use of receiving antennas having inceased directivity for bringing the weaker signals. Antenna positioning is critical not only in urban areas because of the presence of reflected signals from large buildings, but also in rural areas where several sources of a transmitted signal may be available at a particular location.

The prior art discloses many approaches in positioning a rotary antenna. One such approach is described in U.S. Pat. No. 4,263,539 to Barton wherein a signal representing the actual position of the receive antenna is generated and compared with a signal representing the desired position with both signals provided to a comparator, the output of which is a direction control signal. This system is primarily analog in nature with the desired position signal source for generating a signal representing the desired position of the antenna typically being a potentiometer, the resistance of which is responsive to the channel selected. U.S. Pat. No. 3,229,176 to Curll, Jr. et al describes a rotatable shaft positioning system having manual and automatic modes wherein the angular displacement of the channel selector is converted to corresponding rotary antenna drive signals. Thus, antenna rotation is correlated with channel selector knob rotation. U.S. Pat. No. 3,200,314 to Iroler also discloses a rotary antenna positioning system which is directly coupled to the channel tuner shaft that each position of the tuner shaft corresponding to a selected channel electromechanically causes the rotary antenna to be oriented in a corresponding position. Television antenna rotating servo systems are described in U.S. Pat. Nos. 2,794,162 to Lifsey and 3,248,730 to Neumeyer.

Refinements in the prior art in the general approach taken to optimally position a rotary antenna have been numerous, as evidenced by the aforementioned systems. Typical of these improvements are systems in which multiple antenna rotations in searching for a selected station is avoided and wherein the antenna is moved directly to the desired orientation with the smallest displacement angle therebetween subtended. Examples of systems embodying these improvements can be found in U.S. Pat. Nos. 2,989,680 to Weiser et al; 3,448,360 to Pohl; and 3,826,964 to Byrne. These approaches generally represent improvements over earlier antenna positioning systems, but fail to provide a system capable of accurately positioning the receiving antenna with respect to several signal sources and where several operating parameters are utilized for more accurately positioning the receiving antenna relative to the transmitted signal source.

OBJECTS OF THE INVENTION

Accordingly, it is an object of the present invention to provide an improved antenna positioning system.

It is another object of the present invention to provide an automatic positioning system for a rotary antenna in which the antenna rotor automatically seeks the most recent direction of maximum signal strength following station selection.

Still another object of the present invention is to provide a rotary antenna positioning system with improved directional accuracy in which the antenna is sequentially rotated in small increments followed by high speed position detection and comparison with a predetermined, programmed direction by means of a microprocessor.

A further object of the present invention is to provide an improved rotary positioning system for a directive antenna wherein a predetermined direction to the signal source or a predetermined maximum signal level are employed in more accurately orienting the antenna.

A still further object of the present invention is to provide an antenna rotary positioning system which takes into account temporary wind-induced antenna displacement by continuously compensating for this source of antenna pointing error in accurately positioning the antenna.

Still another object of the present invention is to provide an improved rotary antenna positioning system for automatically orienting the antenna to receive maximum transmitted signal strength in an environment in which a plurality of sources of that signal at various locations relative to the receiving antenna are present.

BRIEF DESCRIPTION OF THE DRAWINGS

The appended claims set forth those novel features believed characteristic of the invention. However, the invention itself as well as further objects and advantages thereof will be best understood by reference to the following detailed description of a preferred embodiment taken in conjunction with the accompanying drawings, in which:

DESCRIPTION OF THE PREFERRED EMBODIMENT

Figure 1:
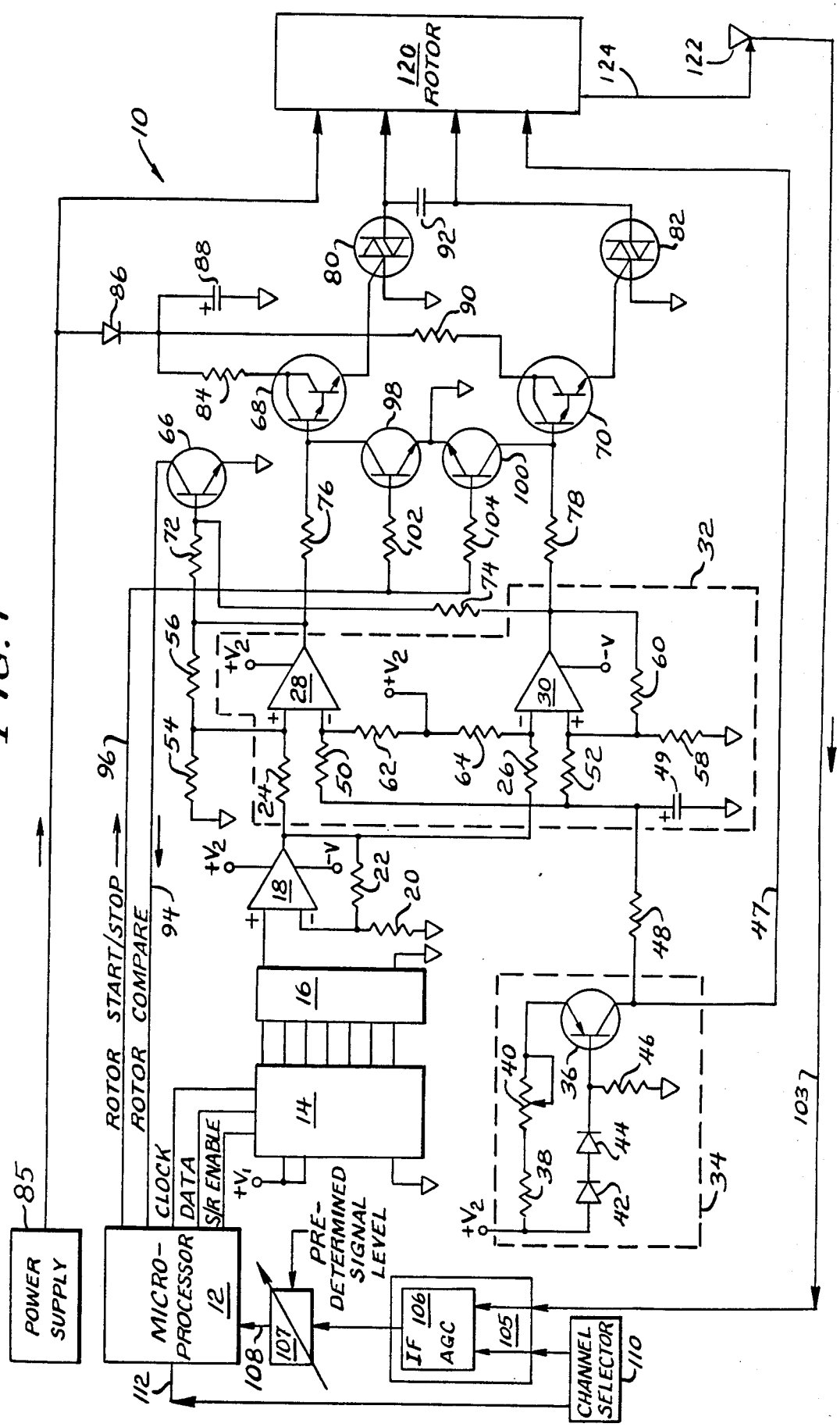
FIG. 1 illustrates partially in block diagram form and partially in schematic diagram form an automatic antenna positioning system in accordance with the present invention.

Referring to FIG. 1, there is shown an automatic antenna positioning system 10 in accordance with the present invention.

Briefly, whenever a channel, or frequency, is selected by means of channel selector 110, the microprocessor 12 produces a binary, 8-bit word which contains the information necessary to turn the rotor 120 to the proper direction for the channel selected. Rotor 120 is coupled to an antenna 122 via line 124 for the rotation thereof. A shift register 14 and resistor network 16 form a digital-to-analog converter which, together with operational amplifier 18 changes the 8-bit binary word to a DC voltage representing the desired antenna direction. The resulting voltage is applied in 40 millivolt steps to two inputs of a window comparator 32 comprised primarily of operational amplifiers 28, 30.

A rheostat 115 inside the rotor 120 operates as a sensor in feeding a voltage back to a current source circuit 34 to the remaining two inputs of the window comparator 32. If the respective voltages on the inputs of the window comparator 32 representing desired and present antenna positions are the same, nothing further happens. If these voltages are not the same, however, either the output of operational amplifier 28 or the output of operational amplifier 30 will swing positive. This turns on transistor 66 and indicates to the microprocessor 12 (through the rotor comparator status line 94) that the voltages are no longer the same. The microprocessor 12 then turns off transistors 98, 100 through the rotor start/stop line 96. If the output of the window comparator 32 is positive, transistors 68, 80 turn on and turn the rotor counterclockwise.

The process described above continues in small voltage incremental steps until the desired direction voltage and present direction voltage are equal. When the rotor 120 reaches the proper direction, both outputs of the window comparator 32 remain negative. This turns off transistor 66 and indicates to the microprocessor 12, through the rotor comparator status lines 94, that the circuit is balanced. The two voltages are checked once each minute to make sure the circuit remains balanced. This keeps the rotor 120 correctly positioned in case wind or some other environmental factor causes it to turn.

At the same time, the microprocessor 12 samples the level of the received signal from the antenna 122 by comparing an intermediate frequency automatic gain control (IFAGC) signal level in a comparator 107 to a predetermined signal level which may be set by the viewer in providing a threshold level detection signal via line 108 to the microprocessor 12. In response to this threshold level detection signal and the rotor position compare signal, the microprocessor 12 provides the antenna's rotor 120 with a control signal for either continuing antenna rotation if the received signal level does not exceed the predetermined signal level or for terminating antenna rotation if the received signal level exceeds the predetermined signal level.

More particularly, clocking, antenna positioning data and rotor set/reset signals are provided by microprocessor 12 to serial input/parallel output shift register 14. Shift register 14 is energized by a $+V_1$ voltage source and converts the digital input signals to 7-bit output signals which are provided to an R2R resistor network 16. Resistor network 16, in turn, provides an analog signal representing a predetermined rotor position corresponding to the selected station to signal comparison circuitry. Shift register 14 in combination with resistor network 16 thus forms a digital-to-analog converter. Microprocessor 12 synthesizes and provides a clocking signal to shift register 14 in a conventional manner for proper signal processing therein. Antenna positioning data representing a position vector is stored in microprocessor 12 and recalled in response to either television receiver turn-on or a station, or channel, selection change. This position data represents the position of the selected transmitting antenna relative to the rotary receiving antenna 122 of maximum received signal strength the last time that particular station was selected. This positioning data is stored in the microprocessor's RAM and recalled upon receiver turn-on or new channel selection. A rotor set/reset signal is provided by microprocessor 12 to shift register 14 for proper initialization thereof.

The analog signal representing desired antenna position is amplified by operational amplifier 18. Resistors 20, 22 establish the gain across operational amplifier 18, which in the preferred embodiment of the present invention is 2. The amplified output from op amp 18 is provided via resistor 24 to the positive input of comparator 28 and via resistor 26 to the negative input of comparator 30. The output of current source 34 is provided via resistor 50 to the negative input of comparator 28 and via resistor 52 to the positive input of comparator 30 with the circuit primarily comprised of comparators 28, 30 forming a window comparator 32 wherein present antenna position is compared with desired antenna position as described in the following paragraphs.

Current source 34 is energized by a $+V_2$ potential provided via diodes 42, 44 to the base of transistor 36 and via resistors 38, 40 to the emitter of transistor 36. Diodes 42, 44 provide a constant $V_{be}$ voltage across transistor 36 while resistors 38, 40 establish the output current of constant current source 34. Variable resistance 40 permits the output current of current source 34 to be selectively varied. Grounded resistor 46 provides proper turn-on biasing for transistor 36.

The output current of transistor 36 is provided to the rotor's rheostat 115 via line 47 and via resistor 48 and resistors 50, 52 to comparators 28, 30, respectively. Resistor 48 in combination with grounded capacitor 49 and resistors 50, 52 form a passive integrator in filtering out noise from the signal provided to comparators 28, 30, which signal represents the current antenna position as explained in the following paragraph.

The present invention contemplates the incorporation of a variable resistance rheostat 115 in the antenna's rotor 120. The resistance of the rheostat is a function of the rotary position of the antenna 122 and varies in response thereto. Thus, with a constant current provided to the rheostat 115 by means of current source 34, the voltage across the rheostat varies as a function of the antenna's position. The voltage provided to comparators 28, 30 via resistor 48 thus represents the position of the antenna's rotor 20. As a result, a signal representing the actual orientation of the antenna 122 is provided to the negative input of comparator 28 and to the positive input of comparator 30, while a signal representing the optimum, or desired, antenna position for station tuning is provided to the positive input of comparator 28 and the negative input of comparator 30. Comparators 28, 30 with their associated resistors and voltage sources $+V_2$ and $-V$ form a window comparator circuit 32. Utilizing a rheostat in the rotor of a variable position antenna to monitor the orientation of the antenna is conventional in nature and does not form a part of the present invention.

Resistors 54, 56 establish the gain across comparator 28 while resistors 58, 60 establish the gain across comparator 30. A $+V_2$ voltage source is coupled to the negative inputs of comparators 28, 30 via resistors 62 and 64, respectively. The combination of the $+V_2$ voltage source and resistors 62, 64 establishes the hysteresis of the window comparator comprised of comparators 28, 30. This hysteresis values establishes the turn-on and turn-off of the window comparator in terms of the threshold voltage comparison in comparators 28 and 30. For example, in the preferred embodiment of the present invention, the output of the resistor network 16 varies from 0 to 5 VDC in rotating the antenna from 0° to 360°. If it is desired that the antenna point in the 180° direction, corresponding to an output of 2.5 VDC from resistor network 16, the driving voltage should be removed from the rotor during rotation at some time prior to arriving at 180°. For example, it may be desirable to terminate the drive signal to the rotor when the antenna position reaches 185° during counterclockwise rotation or 175° during clockwise rotation. The shutoff point in terms of the threshold voltage, or antenna position, is known as the hysteresis of the comparator window and is established by the values of the $+V_2$ voltage source and resistors 62, 64.

If a comparison of the outputs of op amp 18 and current source 34 indicates that the desired antenna angular position is greater than the present antenna angular position, the output of op amp 18 is greater than that of current source 34. This causes the window comparator to turn on in that comparator 28 provides an output since its non-inverting input is higher than its inverting input. The output of comparator 28 is provided via resistor 76 to emitter-follower amplifier 68. The amplified output of emitter-follower 68 is provided to triac 80 which provides a clockwise driving signal to the antenna's rotor 120. Conversely, if a comparison of the desired antenna orientation with the present orientation indicates that the antenna's present position is greater than the desired angular position of the antenna, comparator 30 will provide an output to emitter-follower amplifier 70 via resistor 78. The amplified output of the emitter-follower combination 70 turns on triac 82 in providing a counterclockwise drive signal to the antenna's rotor 120. If the present invention voltage is within the limits of the window comparator relative to the desired antenna position, comparators 28, 30 will both provide negative outputs to emitter-follower amplifiers 68, 70 and no drive signal will be provided to the antenna's rotor. Resistors 76, 78 perform a current-limiting function in series with emitter-follower amplifiers 68, 70 respectively. Resistors 84, 90 perform a collector pull-up function for the rapid turn-on of amplifiers 68, 70, respectively, in providing large drive currents to triacs 80, 82.

Diode 68 and grounded capacitor 88 provide a half-wave rectification function with respect to the output of power supply 85 in providing a DC voltage to the antenna's rotor 120. Capacitor 92 is a directional motor start capacitor from which the phase of the rotor's motor (not shown) can be ascertained for proper starting direction determination. An output signal provided by one of the emitter-follower amplifiers to the corresponding triac results in the grounding of the appropriate phase winding in the rotor's motor via the connecting triac. Consequently, the turn-on of one of the triacs causes the rotor to be driven in a clockwise or counterclockwise direction.

The outputs of comparators 28, 30 are also provided via current limiting resistors 72, 74, respectively, to the base of transistor 66. With the emitter of transistor 66 coupled to ground, an input signal provided by either comparator 38 or comparator 30 to its base will result in the turn-on of transistor 66 with a rotor position compare signal being provided via line 94 to microprocessor 12. Microprocessor 12, in response to the rotor compare signal from transistor 66, then provides a rotor set/reset signal to shift register 14 for circuit initialization followed by antenna positioning data provided digitally thereto. From the rotor compare signal from transistor 66 in response to an output from either comparator 28 or comparator 30, microprocessor 12 determines whether a clockwise or counterclockwise direction of rotation of the rotor is required. The appropriate antenna positioning data is then provided from microprocessor 12 to shift register 14. Microprocessor 12 is programmed to step antenna rotation in angular increments from present antenna position to the desired antenna position. The direction of the incremental steps is determined by the continuous comparison of present and desired antenna position by means of comparators 28, 30 and the rotor compare signal provided by transistor 66 back to microprocessor 12. In this manner, the present position of the antenna 122 is constantly monitored and compared with the desired antenna position in generating step-wise correction signals for proper antenna positioning. In the present invention, a 360° rotation of the antenna is accomplished by varying the voltage of the resistor network 16 output signal from 0 to 5 volts in increments of approximately 14 millivolts with a voltage window of 33 millivolts established by comparators 28 and 30.

To summarize, as long as the voltages on the inputs of the window comparator 32 (desired and present), are the same, nothing further happens. If the voltages are not the same, however, either the output of comparator 28 or the output of comparator 30 will swing positive. This turns on transistor 66 and indicates to the microprocessor 12 (through the rotor comparator status line 94) that the voltages are no longer the same. The microprocessor 12 then turns off transistors 98, 100 via the rotor start/stop line 96. If the output of the window comparator 32 is positive, transistors 68, 80 will turn on and turn the rotor clockwise. If the output of the window comparator 32 provided to transistor 68 is positive, transistors 68, 80 will turn on and turn the rotor clockwise. If the output of the window comparator 32 to transistor 70 is positive, transistors 70, 82 will turn on and turn the rotor counterclockwise.

This process continues in small voltage steps, e.g., 40 millivolts, until the desired antenna direction voltage and the present antenna direction voltage are equal. When the rotor 120 reaches the proper direction, both outputs of the window comparator 32 remain negative. This turns off transistor 66 and indicates to the microprocessor 12 via the rotor compare line 94 that the window comparator circuit 32 is balanced. The two position voltages provided to the window comparator 32 are checked once each minute to make sure the circuit remains balanced which maintains the antenna 122 in the current position should it be temporarily displaced by wind or some other environmental factor.

In the preferred embodiment of the present invention, microprocessor 12 is a Fairchild F3870 microcomputer featuring 2048 bytes of ROM, 64 bytes of scratchpad RAM, a programmable binary timer, 32 bits of input/output, and a single +5 volt power supply requirement. Following a channel number entry by means of channel selector 110, control signals are provided via line 112 to microprocessor 12 and to the antenna's rotor 120. The signal thus provided to the microprocessor 12 causes the last tuned position of the selected channel to be read from memory in the microprocessor and provided in digital form to shift register 14. The signal provided to the antenna's rotor 120 causes the rotor to re-orient itself for optimum signal reception of the selected channel in accordance with the data thus recalled from microprocessor memory and provided to the automatic antenna positioning system 10 as previously described. The data representing optimum antenna pointing direction to the selected channel is in the form of an antenna vector as stored in microprocessor memory. This antenna vector is read from RAM in microprocessor 12 and provided to shift register 14. This causes the rotor 120 to turn in a predetermined direction toward the location of the source of the selected channel. Antenna rotation continues until the output of window comparator 32 is 0 and the receiving antenna 122 is aligned with the main lobe of the transmitting antennna.

The television receiver 105 is coupled to the antenna 122 via line 103 for receiving the transmitted signal. The television receiver includes intermediate frequency automatic gain control (IFAGC) circuitry 106 which is responsive to the received signal level for establishing the proper intermediate frequency signal level in the television receiver. The IFAGC output is then provided to a variable threshold comparator 107 where it is compared with a predetermined signal level which may be established by the viewer. The threshold signal level may be defined as the minimum signal level required for the presentation of a satisfactory video image and is dependent upon viewer preference. The IFAGC circuit 106 and threshold comparator 107 envisioned for use in the present invention are conventional in nature and do not form a part of the present invention.

In response to the comparison of the IFAGC signal representing the received signal level and a predetermined signal level in threshold comparator 107, a threshold detection signal is provided via line 108 to the microprocessor 12. If the threshold detetion signal indicates that the received signal strength is satisfactory, the microprocessor 12 terminates the antenna stepping process described in detail below. If the threshold detection signal indicates that the received signal strength is less than desired, or less than the aforementioned predetermined signal level, the microprocessor continues to step the rotary antenna 122 until the antenna is displaced 180° from due North, or the starting point of antenna rotation. If during the initial search rotation of the antenna a signal level exceeding the predetermined signal level which is displaced from the desired antenna position is detected the new transmitting antenna position providing greater signal strength replaces the previously stored vector information and this new direction is utilized in subsequent antenna positioning.

Figure 2A:
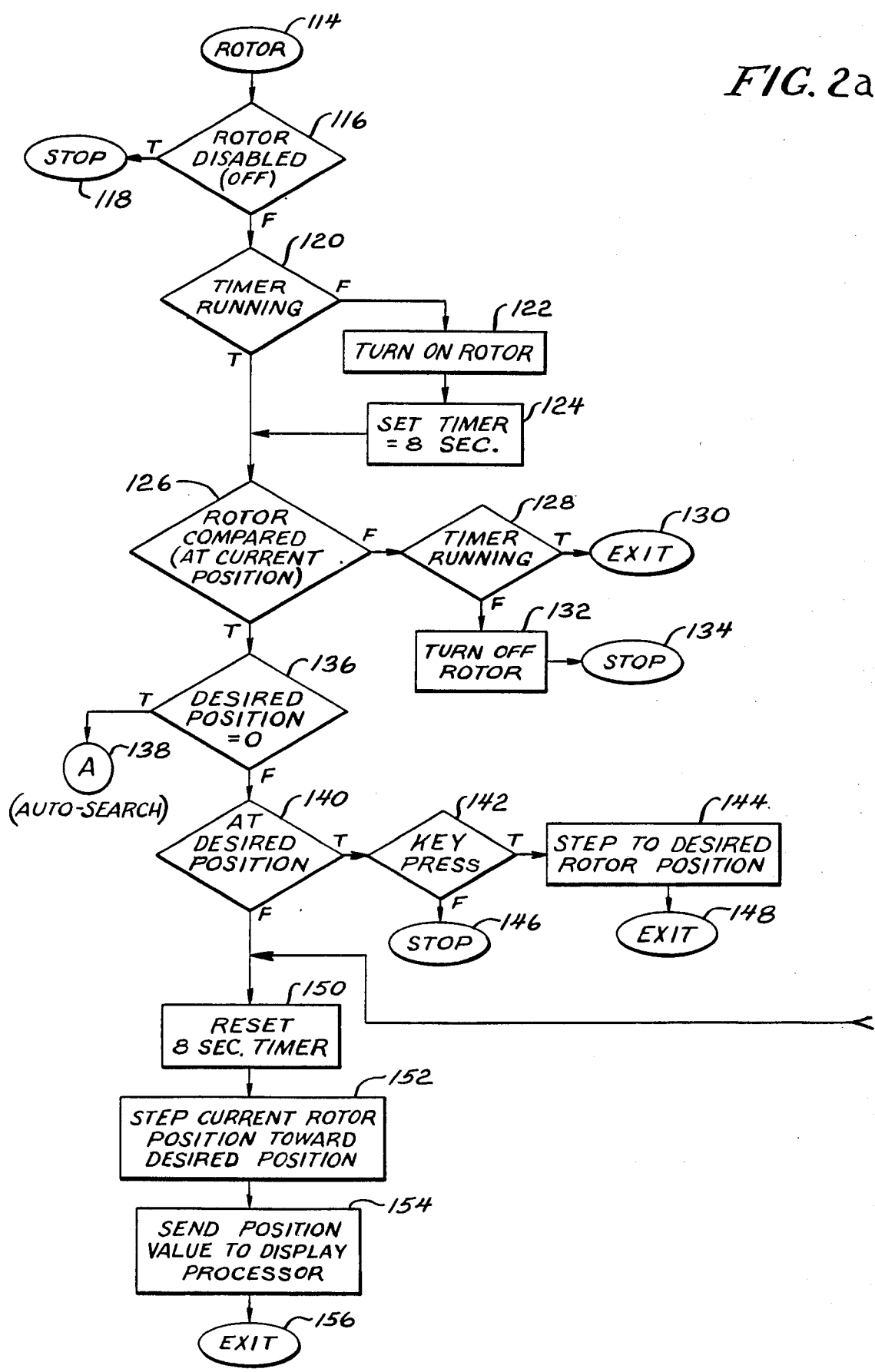
FIGS. 2a and 2b show the signal processing in terms of the logic and decision making implemented by the microprocessor in carrying out the present invention.

The manner in which digital signals are processed in microprocessor 12 in automatically positioning a receiving antenna for optimal signal reception will now be briefly explained with reference to the flow charts shown in FIGS. 2a and 2b. In referring to FIGS. 2a and 2b, an oval symbol indicates the start or stop of an operational sequence, a rectangle indicates an instruction or set of instructions resulting in the performance of a control function and a diamond indicates a decision point based upon the comparison of binary signal inputs.

The antenna rotation program is entered at 114 with the status of a rotor disable switch checked at 116. If the rotor disable switch has been engaged the program terminates at step 118. If the rotor disable switch has not been engaged, the program begins monitoring system timing 120, turns on the rotor 122, and sets the program timer for an 8 second interval 124. The current position of the rotor is then compared with desired antenna position based upon the selected station 126 and if the comparison is within limits, the timer continues to run 128 with the program returning to the general television receiver control program 130, or the rotor is turned off 132 and the program terminated 134.

The program next checks to see if the desired antenna position of 0° 136, which is the initial position of the antenna.

TABLE I

```
                    ;;;     GR3000 PLL PROCESSOR
                            H. BRAHMAN       7-DEC-79
                    ;       COPYRIGHT 12/79  HEATH CO.  BENTON HARBOR, MI.
        251         ;ION    XIEXT  PIDEF
        252         ;

;       PIDEF - PROCESSOR #1 DEFINITIONS
        254X        ;;
        255X        ;       EXECUTION INDICES
        256X        ;
        257X                ORG     0
0000    258X
0000    259X
        260X
0000    261X  $1.DACD  RES    1         ;WRITE RAM TOUCH-KEY VALUES TO DAC.
0001    262X  $1.RAXC  RES    1         ;READ ACCESS CODE FROM KEYPAD OR REMOTE
        263X
        264X        ;;
        265X        ;       SCRATCHPAD BYTE DEFINITIONS
        266X        ;
        267X                ORG     0
0000    268X
        269X  R1.FLG1  RES    1         ;FLAG REGISTER #1
0001    270X  R1.LCK   =   00000001B    ;HANDSHAKE LOCK-OUT
0001    271X  R1.AGCD  =   00000010B    ;AGC DELAY TIMER ACTIVE
0002    272X  R1.FTCS  =   00000100B    ;FINE TUNE CHANNEL SCAN
0004    273X  R1.AMT   =   00001000B    ;AUDIO MUTE TOGGLE
0008    274X  R1.LFR   =   00010000B    ;LINE FREQUENCY LEVEL FLAG
0010    275X  B1.ROF   =   01000000B    ;ROTOR OFF FLAG
0020    276X  R1.VMT   =   10000000B    ;VIDEO MUTE DISABLED
0080    277X  R1.FLG2  RES    1         ;FLAG REGISTER #2
0001    278X  R1.RKU   =   00000001B    ;REMOTE KEY DOWN
0001    279X  B1.SP    =   00000010B    ;STACK POINTER
0002    280X  R1.24H   =   00000100B    ;24 HOUR FORMAT
0004    281X  B1.SKD   =   00001000B    ;SOFT KEY DOWN (STEP FUNCTIONS)
0008    282X  R1.PGI   =   00010000B    ;SOFT KEY PROGRAM MODE INITIATE
0010    283X  R1.PVD   =   00100000B    ;SOFTKEY PREVIOUS DIGIT FLAG
0020    284X  RM1.PAS  =   11000000B    ;KEYPAD DEBOUNCE FLAGS
00C0    285X
        286X        ;       DELAY COUNTERS AND DISPLAY CONTROL FLAGS
        287X
```

| | | | | | |
|---|---|---|---|---|---|
| 0010 | 0001 | 288X | S1.NTD | RES | 200 | ;NEXT TIME TO DISPLAY |
| 0010 | 0001 | 289X | S1.ON | RES | 1 | ;CURRENT 'ON' TIME REMAINING FOR DISPLAY |
| 0011 | 0001 | 290X | S1.DFF | RES | 1 | ;DISPLAY FIELD FLAGS |
| 0012 | 0001 | 291X | F.CHN | = | 00000001H | ;"CHANNEL" FIELD |
| | 0002 | 292X | F.CND | = | 00000010H | ;CHANNEL # FIELD |
| | 0004 | 293X | F.AP | = | 00000100H | ;AM-PM FIELD |
| | 0008 | 294X | F.HM | = | 00001000H | ;HOURS-MINUTES FIELD |
| | 0010 | 295X | F.SEC | = | 00010000H | ;SECONDS FIELD |
| | 0020 | 296X | F.DAY | = | 00100000H | ;DAY FIELD |
| | 0040 | 297X | F.DATE | = | 01000000H | ;DATE FIELD |
| | 0080 | 298X | F.MO | = | 10000000H | ;MONTH FIELD |
| 0013 | 0001 | 300X | S1.PCF | RES | 1 | ;PROCEDURE CALLS AND FLAGS |
| | 0003 | 301X | HM1.RPC | = | 00000011H | ;MOTOR PROCEDURE CALL MASK |
| | 0000 | 302X | RP.PVV | = | 0 | ;POSITION TO VECTOR VALUE |
| | 0001 | 303X | RP.FNP | = | 1 | ;FIND NORTH POSITION |
| | 0002 | 304X | RP.FMS | = | 2 | ;FIND MAX SIGNAL |
| | 0003 | 305X | RP.KEY | = | 3 | ;KEY STEP PROCEDURE |
| | 000C | 306X | HM1.SKP | = | 00001100H | ;SPECIAL KEY PROCEDURES |
| | 0000 | 307X | SK.TFMT | = | 0*4 | ;TIME FORMAT PROCEDURE |
| | 0004 | 308X | SK.TSET | = | 1*4 | ;TIME SET PROCEDURE |
| | 0008 | 309X | SK.DATE | = | 2*4 | ;DAY-DATE-MONTH SET PROCEDURE |
| | 000C | 310X | SK.FMI | = | 3*4 | ;DISPLAY FORMAT PROCEDURE |
| | 0000 | 311X | RM1.CUR | = | 0*4 | ;CURSOR POSITION FOR SPECIAL KEY MODES |
| | 0000 | 312X | CP.0 | = | 0*16 | ;CHANNEL TITLE SELECT |
| | 0010 | 313X | CP.1 | = | 1*16 | ;CHAN # SELECT |
| | 0020 | 314X | CP.2 | = | 2*16 | ;MINUTES SET, AM,PM SELECT |
| | 0030 | 315X | CP.3 | = | 3*16 | ;HOURS SET, HRS,MIN SELECT |
| | 0040 | 316X | CP.4 | = | 4*16 | ;SECONDS SET, SECONDS SELECT |
| | 0050 | 317X | CP.5 | = | 5*16 | ;DAY SET, DAY SELECT |
| | 0060 | 318X | CP.6 | = | 6*16 | ;DATE SET, DATE SELECT |
| | 0070 | 319X | CP.7 | = | 7*16 | ;MONTH SET, MONTH SELECT |
| | 0080 | 320X | R1.DOVI | = | 10000000H | ;INHIBIT .PRG CALLING OF *DOV* |
| | 0001 | 321X | SK.IVL | = | 0*16+H1.DOVI | ;DISPLAY INTERVAL SET |
| | 0001 | 322X | SK.DUR | = | 1*16+H1.DOVI | ;DISPLAY DURATION SET |
| 0014 | 0001 | 323X | F.DIR | RES | 1 | ;TOUCH KEY DIRECTION VALUE |
| 0015 | 0001 | 324X | S1.RDLY | RES | 1 | ;ROTOR DELAY COUNTER |
| 0016 | 0001 | 325X | S1.KDLY | RES | 1 | ;KEY DELAY COUNTER (FOR UP-DOWN, ETC) |
| 0017 | 0001 | 326X | S1.DDLY | RES | 1 | ;DISPLAY DELAY COUNTER |
| | | 327X | ; | | | |
| | | 328X | | VRAM BUFFER | | |
| | | 329X | ; | | | |
| 001A | | 330X | | ORG | 300 | |
| 001A | 000A | 331X | HU.DSP | RES | A | ;DISPLAY PROCESSOR BUFFER |
| | 0000 | 332X | | FRRMT | 400-* | |
| | | 333X | ; | | | |
| | | 334X | | KEYPAD DATA VALUES AND FLAGS | | |
| | | 335X | ; | | | |
| 0020 | | 336X | | ORG | 400 | |

```
0020    0001   0337X  S1.CKY   RES   1              ;CURRENT KEY VALUE
0021    0002   033HX  S1.DKA   RES   2              ;DIGIT KEY ACCUMULATORS
0023    0001   0339X  S1.LFG   RES   1              ;LATCH FLAG BITS
        0002   0340X  L.PWR    =     00000001B      ;POWER ON
        0002   0341X  L.TFH    =     00000010B      ;TACTILE FEEDBACK REEP
        0004   0342X  L.CH1    =     00000100B      ;CHANNEL 1 AUDIO ENABLE
        0008   0343X  L.RUN    =     00001000B      ;ROTOR ON
        0010   0344X  L.VHF    =     00010000B      ;VHF HANDSWITCH
        0020   0345X  L.HVHF   =     00100000B      ;HIGH VHF BAND
        0040   0346X  L.CATV   =     01000000B      ;MID AND SUPERBANDS
        0080   0347X  L.VMT    =     10000000B      ;VIDEO MUTE OUTPUT
0024    0001   0348X  S1.TFD   RES   1              ;TACTILE FEEDBACK DELAY
0025    0001   0349X  S1.KHD   RES   1              ;KEYPAD DATA VALUE
0026    0001   0350X  S1.DLY   RES   1              ;STEPPING DELAY COUNTER UPPER
0027    0001   0351X  S1.PKV   RES   1              ;PREVIOUS KEY VALUE
               0352X
               0353X
               0354X  ;           TIMER INTERRUPT VALUES
               0355X
0028    0001   0356X           ORG   500
0028    0001   0357X  S1.ISV   RES   1              ;ISAR SAVE, TIMER INTERRUPT
0029    0001   0358X  S1.JSV   RES   1              ;J REG SAVE
002A    0001   0359X  S1.HIS   RES   1              ;HI SAVE
002B    0001   0360X  S1.HLS   RES   1              ;HL SAVE
002C    0001   0361X  S1.TTC   RES   1              ;TTC COUNTER
002D    0001   0362X  S1.EPMS  RES   1              ;EXTERNAL PROCESSOR MODE (SOFTKEY)
002E    0001   0363X  S1.EPMK  RES   1              ;EXTERNAL PROCESSOR MODE (KEYPAD)
002F    0000   0364X  S1.IDS   RES   1              ;SYSTEM ID STATUS (PROCESSORS IN SYSTEM)
        0000   0365X           ERRMI 600-*
               0366X
               0367X  ;           CLOCK
               0368X
0030    0001   0369X           ORG   600
0030    0001   0370X  S1.SEC   RES   1              ;SECONDS
0031    0001   0371X  S1.MIN   RES   1              ;MINUTES
0032    0001   0372X  S1.HRS   RES   1              ;HOURS
0033    0001   0373X  S1.WKD   RES   1              ;WEEK DAY
0034    0001   0374X  S1.DAY   RES   1              ;DAY
0035    0001   0375X  S1.MO    RES   1              ;MONTH
0036    0001   0376X  S1.MDLY  RES   1              ;MUTE DELAY
0037    0000   0377X  S1.LFC   RES   1              ;60 HZ LINE FREQ COUNTER
        0000   0378X           ERRMI 700-*
               0379X
               0380X  ;           STACK AREA
               0381X
               0382X
003A    0004   0383X  S1.STK   RES   4              ;2 LEVEL STACK AREA
003B    0001   0384X           RES   1              ;RESERVED BYTES
003D    0001   0385X           RES   1
```

```
0001   386X  S1.EXC  RES  1                    ;CHANNEL EXCLUSION FLAG
0001   387X  S1.PRQ  RES  1                    ;PRIORITY REQUEST FLAGS
0001   388X  PR.PCU   =   00000001B            ;PROCESS CLOCK UPDATE
0002   389X  PR.PLL   =   00000010B            ;PLL PROCESSOR
0004   390X  PK.SPG   =   00000100B            ;SOFT KEY PROGRAM MODE
0008   391X  PK.SRN   =   00001000B            ;SOFT KEY RUN MODE
0010   392X  PK.DOV   =   00010000B            ;DISPLAY ON-SCREEN VALUES
0020   393X  PK.SFP   =   00100000B            ;STEP FUNCTION PROCESSOR
0040   394X  PR.ROT   =   01000000B            ;ROTOR SCAN PROCESSOR
0080   395X  PR.SKP   =   10000000B            ;SPECIAL KEY MODE PROCESSOR
0000   396X          EKKMT 1000y-*
       670
       672   ;;
       673   ;      PORT DEFINITIONS
       674   ;
0000   675   P.HAH    =   0                    ;HANDSHAKE ADDRESS BUSS
0001   676   P.LDH    =   1                    ;LOCAL DATA BUSS
0004   677   P.HDR    =   4                    ;HANDSHAKE DATA BUSS
0005   678   P.CTL    =   5                    ;CONTROL PORT
       679
       680   ;      P.CTL BIT DEFINITIONS
       681   ;
0007   682   BM.DS    =   00000111B            ;DEVICE SELECT BIT MASK
0000   683   DS.NULL  =   0                    ;NULL DEVICE
0001   684   DS.KPR   =   1                    ;KEYPAD READ
0002   685   DS.PLL   =   2                    ;PLL ENABLE
0003   686   DS.RAM   =   3                    ;RAM ENABLE
0004   687   DS.DAC   =   4                    ;D/A CONVERTER ENABLE
0005   688   DS.ROT   =   5                    ;ROTOR DAC
0006   689   DS.HHL   =   6                    ;R HIT LATCH
0008   690   B.RW     =   00001000B            ;READ/WRITE BIT
0010   691   B.LFT    =   81.LFR               ;LINE FREQUENCY INPUT BIT
0000   692          EKRNZ  81.LFR-1000QH
0020   693   B.ROT    =   00100000B            ;ROTOR COMPARATOR (1 = NOT POSITIONED)
0040   694   B.RDL    =   01000000B            ;BUSS DRIVER LATCH
0080   695   B.SCN    =   10000000B            ;CHANNEL SCAN INPUT
       704          ION   L
1980   705          XTEXT PIRAM
       707X  ;;     P1RAM - PROCESSOR #1 RAM DEFINITIONS
       708X  ;
       709X          ORG   0
       710X
0001   711X
0001   712X  SIM.CHK  RES  1                   ;RAM CHECK BYTE
0001   713X  SIM.TCC   =   *                   ;CHANNEL TOUCH KEY CONTROL VALUE
```

| | | | | | |
|---|---|---|---|---|---|
|0001|714X|$IM.CHN|RES|1|;CURRENT CHANNEL #|
|0002|715X|$IM.TKC|RES|*|;TOUCH KEY CONTROL VALUES|
|0001|716X|$IM.BRI|RES|1|;BRIGHTNESS|
|0001|717X|$IM.COL|RES|1|;COLOR|
|0001|718X|$IM.VOL|RES|1|;VOLUME|
|0001|719X|$IM.CON|RES|1|;CONTRAST|
|0001|720X|$IM.TIN|RES|1|;TINT|
|0005|721X|$IM.TKL|RES|5|;LENGTH OF TOUCH KEY ENTRYS|
| |722X| |=|*-$IM.TKC| |
| |723X|;|CLOCK SAVE VALUES| | |
| |724X| | | | |
|0001|725X|$IM.SEC|RES|1|;SECONDS|
|0001|726X|$IM.MIN|RES|1|;MINUTES|
|0001|727X|$IM.HRS|RES|1|;HOURS|
|0001|728X|$IM.WKD|RES|1|;WEEK DAY|
|0001|729X|$IM.DAY|RES|1|;DAY|
|0001|730X|$IM.MO|RES|1|;MONTH|
| |731X| | | | |
| |732X| | | | |
| |733X|;| | | |
|0001|734X|$IM.IVL|RES|1|;DISPLAY INTERVAL TIME|
|0001|735X|$IM.DUR|RES|1|;DISPLAY DURATION|
| |736X| | | | |
|0001|737X|$IM.CRP|RES|1|;CURRENT ROTOR POSITION|
| |738X| | | | |
|0001|739X|$IM.ACF|RES|1|;ACCESS CODE ENABLE-DISABLE FLAG|
|0007|740X|$IM.AXC|RES|7|;ACCESS CODE|
|0001|741X|$IM.SCR|RES|1|;SCRATCH BYTE|
| |742X|;| | | |
| |743X|;|ON SCREEN DISPLAY POSITIONS| | |
| |744X| | | | |
|0001|745X|$IM.PV2|RES|1|;SET MODE VERTICAL POSITION|
|0001|746X|$IM.PH2|RES|1|;SET MODE HORIZONTAL POSITION|
|0001|747X|$IM.PV1|RES|1|;VERTICAL POSITION|
|0001|748X|$IM.PH1|RES|1|;HORIZONTAL POSITION|
| |749X|;|TUNING VALUES| | |
| |750X| | | | |
|0052|752X|$IM.ROT|RES|82|;ROTOR VALUES FOR 82 CHANNELS|
|001E|753X|$IM.CH|RES|30|;FINETUNE VALUES FOR CABLE CHANNELS|
|001E|754X|$IM.CHL|=| |*-$IM.CH|
|000C|755X|$IM.VHF|RES|12|;FINETUNE VALUES FOR VHF CHANNELS|
|0049|756X|$IM.CHE|=|*| |
| |757X| | | | |
| |758X|;|SOFT KEY PROGRAMMING AREA| | |
| |759X| | | | |
|0099|760X|$IM.SK1|RES|1|;SOFT KEY #1 FWA|
|0001|761X|$IM.SK2|RES|1|;SOFT KEY #2 FWA|
|0001|762X|$IM.SK3|RES|1|;SOFT KEY #3 FWA|
|0001|763X|$IM.SK4|RES|1|;SOFT KEY #4 FWA|

```
009D   0001   764X  SIM.SK5  RES   1              ;SOFT KEY #5 FWA
009E   0001   765X  SIM.SK6  RES   1              ;SOFT KEY #6 FWA
009F   0001   766X  SIM.SK7  RES   1              ;SOFT KEY #7 FWA
00A0   0001   767X  SIM.SK8  RES   1              ;SOFT KEY #8 FWA
00A1   0001   768X  SIM.FFA  RES   1              ;SOFT KEY FIRST FREE ADDRESS
       00A2   769X  SIM.SKD  =     *              ;SOFT KEY DATA FWA
       00FF   770X  SIM.SKE  =     0FFH           ;LAST POSITION AVAILABLE FOR SOFT KEY ENTRYS
       005E   771X  ERRMI    =     256-*          ;FREE LOCATIONS

773   ;
              774   ;      IR.XXXX - INTERNAL RAM ADDRESS DEFINITIONS
              775   ;
0FC0          776            ORG   0FC0H          ;UPPER 64 BYTES
              777   ;
              778   ;      ROTOR SEARCH POSITIONS FOR MAX SIGNAL
              779   ;
0FC0   0001   780   IR.TRP   RES   1              ;TEMPORARY ROTOR POSITION DURING MAX. SEARCH
0FC1   0001   781   IR.RSS   RES   1              ;MAX. SIGNAL SECTOR SIZE
0FC2   0001   782   IR.RSC   RES   1              ;MAX. SIGNAL SECTOR CENTER
0FC3   0001   783   IR.RCS   RES   1              ;CURRENT SIGNAL START POSITION
0FC4   0001   784   IR.WRP   RES   1              ;NORTH WRAP END POSITION
0FC5   0001   785            RES   1              ;SUB BYTE
              2525  ;
              2526  ;      ROT - POSITION ROTOR
              2527  ;
              2528  ;      RHOT POSITIONS THE ROTOR TO THE VALUE IN THE ROTOR POSITION FOR THE
              2529  ;      CURRENT CHANNEL
              2530  ;
              2531  ;
              2532  ;      ENTRY  NONE
              2533  ;      EXIT   1. TO .NDSPCH IF ROTOR COMPARISON NOT MADE
              2534  ;             2. TO .RFSEIR IF ROTOR TIMER TIMED OUT
              2535  ;             3. TO .DOV IF COMPARISON MADE BUT NOT AT DESIRED POSITION
              2536  ;                    (STEPS TO NEXT POSITION TOWARD DESIRED POSITION)
              2537  ;
05EE  2A0F6C  2538  ROT      DCI   .HLIM          ;(DCO) = ROTOR LIMIT VALUE ADDRESS
05F1   40     2539  ROT.     LR    A,FLG1
05F2   2120   2540            FRRNZ SCN2ROT/256
05F4   841H   2541            NI    R1.ROF
05F6   6H     2542            HZ    .RESFIR
       6H     2543            LISL  SI.LFG&7
05F7   7A     2544            LIS   L.RUN
05F8   FC     2545            NS    5
05F9  9408    2546            BNZ   ROT.1
05FA   7B     2547            LIS   L.RUN
05FB   FC     2548            NS    5
05FC   5C     2549            LR    S.A
05FD   62     2550            LISU  SI.RDLY/8
05FE   6D     2551            LISL  SI.RDLY&7
05FF   7A     2552            LIS   R              ;HAVE INITIAL DELAY SET, ROTOR ON.
```

*(TURN ON ROTOR)*

```
0601    5C                      2553            LR      S,A              ;SET INITIAL DELAY
0602    A5                      2554            INS     P.CTL
0603    2120                    2555    ROT.1   NI      R.ROT
0605    62                      2556            LISU    S1.RDLY/R
0606    6D                      2557            LISL    S1.RDLYX7
0607    8432            063A    2558            BZ      ROT.2            ;ROTOR COMPARE
0609    70                      2559            CLR
060A    FC                      2560            XS      S
060B    942A            0636    2561            BNZ     .NDSXDC          ;STILL RUNNING
                                2562    ;
                                2563    ;       ROTOR DELAY TIMED OUT. SHUT OFF ROTOR (STALLED MAYBE.)
                                2564    ;
060D    2800F1                  2565    .RESETR P1      LISL    7HP      ;ZERO ROTOR PROCEDURES
0610    6D                      2566            LISL    S1.RDLYX7
0611    70                      2567            CLR
0612    5C                      2568            LR      S,A
0613    64                      2569            LISU    S1.LFG/R
0614    6A                      2570            LISL    S1.LFGX7
0615    20F7                    2571            LI      .NOT.21.RUN
0617    FC                      2572            NS      S
0618    5C                      2573            LR      S,A
0619    90B2            085C    2574            BR      .RESETI          ;TURN OFF ROTOR
                                                                         ;INSURE ROTOR TURNED OFF
                                                                         ;RESET PR.ROT
                                2576    ;
                                2577    ;       INITIALIZE FOR MAX SIGNAL DETERMINATION
061A    0F                      2578    PROT.IM LR      DC,Q             ;RESTORE IR.RSS
061C    17                      2579            ST
061D    17                      2580            ST
061F    0F                      2581            ERRNZ   IR.RCS-IR.RSS-2
061F    A5                      2582            INS     P.CTL            ;INITIALIZE START AND SIZE VALUES
0620    8102    0000            2583            BC      PRO.IM1
0623    18                      2584            COM
0624    17                      2585            NS      S
                                2586    PRO.IM1  ST
0625    17                      2587            ST
0626    43                      2588            LR      A,R3
0627    25                      2589            DB      MI.CT
                                2590    ;
                                2591    ;       INITIALIZE NORTH SEARCH PROCEDURE
                                2592    ;
0628    44                      2593    PROT.N  LR      A,R4
0629    13                      2594            SL      1             ;IS CURRENT POSITION IN 0-180 HALF
062A    71                      2595            LIS     1             ;ASSUME NORTH CLOSEST TO 0-180
062B    8103    062F            2596            BP      PROT.N1       ;MOVE TOWARD 0 DEG.
062D    207F                    2597            LI      7FH           ;MOVE TOWARD 360 DEG.
062F    2A0FC0                  2598    PROT.N1 DCI     IR.TRP
0632    17                      2599            ST
0633    4C                      2600            LR      A,S           ;SAVE TEMPORARY ROTOR POSITION
```

```
0634   1F                  2602           INC            ;ADVANCE TO NEXT PROCEDURE
0635   5C                  2603           LR    S,A      ;RESTORE NEXT DISPATCH ADDRESS
0636   2C                  2604           LR    XDC      ;EXIT TO NEXT PROCESSOR
0637   290484              2605           JMP   .NDSPCH
                           2606
                           2607   ; ROTOR COMPARISON MADE, SEE IF AT DESIRED POSITION
                           2608
063A   68                  2609   PROT.2  LISL  S1.PCF&7
063B   73           0000   2610           ERRNZ S1.PCF?S1.ROLY/8
063C   FC                  2611           LIS   8
063D   59                  2612           NS    S
063E   2A0E2A              2613           LR    J,A      ;SAVE ROTOR PROCEDURES
0641   54                  2614           PI    READCR   ;READ CURRENT ROTOR POSITION
0642   2A0E44              2615           LR    R4,A
0645   41C7         0600   2616           PI    READR    ;READ DESIRED ROTOR POSITION
0647   A424         066C   2617           RM    ,MESEIR  ;NOT ROTOR VALUE (CHANNEL #)
0649   1A                  2618           BZ    PROT.3   ;NOT ACCESSED
064A   1F                  2619           COM
                           2620           INC
064B   C4                  2621   PROT.   AS    R4       ;COMPARE DESIRED TO ACTUAL
064C   940B         0655   2622           BNZ   PROT.B   ;NOT AT DESIRED POSITION, STEP IT.
064E   73                  2623           LIS   HP,KEY
064F   3A                  2624           DS    HU       ;(HU) = ROTOR ADDRESS (ASSUME KEYPRESS)
0650   E9                  2625           XS    1
0651   8494         05E6   2626           BZ    AKP.     ;KEY PRESS, STEP ROTOR
0653   90B9         0600   2627           BR    .RESEIR  ;AT DESIRED AND NOT KEY PRESS, EXIT
                           2628
                           2629   ; NOT AT DESIRED POSITION, STEP POSITION AND DISPLAY IT
                           2630
       60                  2631   PROT.B  LISL  S1.ROLY&7
       7A                  2632           LIS   J
       44                  2633           ERRNZ S1.ROLY-12F.DIR&7
0658   71                  2634           BRNZ  1        ;WRITE DIRECTION FROM F.DIR
0659   9103         0650   2635           LIS   1
065A   1A                  2636           AM    PROT.1
                           2637           COM
                           2638           INC
065D   1F                  2639   PROT.B1 LR    S,A
065D   5C                  2640           AS    R4
065E   C4                  2641           LR    R8,A     ;(A) = NEW CURRENT ROTOR POSITION
065F   58                  2642           PI    WRITCR   ;WRITE NEW CURRENT ROTOR POSITION
0660   2A0E7B              2643           PI    DIR      ;WRITE DIRECTION FROM (R7)
0663   2A01HC              2644   ROTD.   PI    ROTD     ;SET NEW ANALOG ROTOR VALUE
0666   280D6E              2645           JMP   CLR.D    ;DISPLAY VALUES
0669   2903CF              2646
                           2647
                           2648   ; PROCESS ROTOR PROCEDURES
                           2649
066C   39                  2650   PROT.3  DS    J
```

```
0660  2A0FC0              DCI   IR.TRP          ;(DC0) = TEMPORARY ROTOR VALUE ADDRESS
0670  91H7      0628      HM    PROT.N          ;NO PROCEDURE, START NORTH SEARCH
0672  16                  LM
0673            0000      ERRNZ IR.RSS-IR.TRP-1
0674  18                  COM
0675  1F                  INC
0676  53                  LR    R3,A            ;SAVE -VALUE FOR LATER COMPARISONS
0677  C4                  AS    R4              ;COMPARE WITH CURRENT ROTOR POSITION
0678  0E                  LR    0,DC            ;SAVE IR.RSS
0679  16                  LM
067A  55                  LR    R5,A            ;(R5) = SIGNAL SECTOR SIZE
067A            0000      ERRNZ IR.HSC-IR.RSS-1
067A  16                  LM
067B  56                  LR    R6,A            ;(R6) = SECTOR CENTER
067C            0000      ERRNZ IR.HCS-IR.RSS-2
067C  16                  LM
067D  58                  LR    HL,A            ;(HL) = CURRENT START POSITION
067F  941E      069D      BNZ   PROT.4          ;NOT AT DESIRED POSITION
0680  70                  CLR
0681  39                  DS    J
0682  9198      061B      BM    PROT.IM         ;FOUND NORTH, INIT FOR MAX SIGNAL SEARCH
                          ;
                          ;     HAVE SEARCHED ALL DIRECTIONS, NOW DETERMINE MAX. SIGNAL
                          ;
0684  EB                  XS    HL              ;HAVE START
0685  9402      068A      BNZ   ROT.6           ;USE CURRENT POSITION AS START
0687  44                  LR    A,R4
0688  2280                OI    ROH
068A  5B                  LR    HL,A            ;START POSITION WRAPPED
068A            0000      ERRNZ IR.WRP-IR.RCS-1
068B  16                  LM
068C  54                  LR    R4,A
068D  280C54              LM    CHS
0690  54                  LR    R4,A            ;USE WRAPPED POSITION IF LARGEST ONE
0691  F4                  NS    R4
0692  A4C0      0653      BZ    .RFSRL
0694  280F4E              PI    WRITR           ;NO SIZE, RESET ROTOR
0697  280F1           PI    ZRP              ;WRITE POSITION TO ROTOR
                          PI                   ;ZERO PROCEDURE FOR FINAL VECTOR POSITION
069D  39        PROT.4    DS    J
069E  9412      06A1      BNZ   PROT.5          ;NOT AT NORTH STARTING POSITION
                          ;
                          ;     FIND MAX. SIGNAL
                          ;
06A0  0F                  LR    DC,U
06A1  HD                  CM
06A2  HD                  ERRNZ IR.HCS-IR.RSS-2 ;(DC0) = CURRENT SECTOR START POSITION (IR.RCS)
```

```
06A3  A5            INS   P.CIL
06A4  70            CLR
              FHRNZ   4.SLN-KOH
0000 06A5  910E     AM    RMS.4           ;HAVE SIGNAL
     06A6  FH       XS    HL
06B1 06A7  H40H     HZ    PRO1.5          ;NO SIGNAL CHANGE, STEP AND EXIT
     06AA  70       CLR
     06AB  17       ST
06A7 06AC  910A     AM    RMS.5           ;CLEAR START POSITION
     06AD  280C54   PI    CRS             ;WRAP, WRITE END POSITION FROM NORTH
     06AF  43       LR    A,R3            ;SAVE SECTOR IF LARGEST
06AH 06B1  9098     HR    PRO1            ;STEP TOWARD DESIRED POSITION
                PRO1.5
06B4  EH       RMS.4  XS    HL
06B5  94FH            HNZ   PRO1.5        ;NO CHANGE, STEP AND EXIT
06B7  44       RMS.5  LR    A,R4
06B8  17              ST
06B9  90F7            HR    PRO1.5        ;SAVE CURRENT START OR WRAPPED END POSITION
              4122   LON   L
              4124   CRS - COMPARE ROTOR SECTOR SIZE
              4126   ;
              4127   ;
              4128   ;     ENTRY (HL) = START POSITION
              4129   ;           (R4) = END POSITION
              4130   ;           (0)  = SECTOR SIZE ADDRESS
              4131   ;           (A)  = CURRENT CENTER OF MAX. SECTOR
              4132   ;           IR,RSS,IR,RSC UPDATED
              4133   ;     EXIT  W,R2,DC0
              4134         USFS  A,HL
0C54  4A       CRS    LR    A,HL
0C55  1H              CUM
0C56  C4              AS    R4
0C57  8102            HP    CRS.1
0C59  1H              CUM
0C5A  52              LR    A2,A
0C5B  1H              CUM
0C5C  C5              AS    R5
0C5D  46       CRS.1  LR    A,HD         ;(R2) = SIZE OF SECTOR
0C5E  8108            HR    CRS.x
0C60  42              LR    A,R2         ;ASSUME NOT NEW MAX.
0C61  0F              LR    A,HO         ;NOT NEW MAX, EXIT
0C62  17              SI
0C63  48              LR    A,HL         ;SAVE NEW SIZE
0C64  14              SI
0C65  17              SI
0C66  17       CRS.x  PUP   1
0C67  1C              FRRPI
                FRRPI ;FREE BYTES LEFT
0000 5194    DECOH-*

ASSEMBLY COMPLETE
5206 STATEMENTS
1 ERRORS DETECTED
15376 BYTES FREE
```

If the initial desired position of 0°, the program proceeds to the auto search mode 138 which is explained below. If the desired position is other than 0°, the program compares its present position with the desired position 140 and, if coincidence occurs, the program checks for a new station selection 142 and if none has been selected the program terminates 146. If a new station has been selected, the program effects a change in antenna position in a step-wise manner 144 toward the desired position and exits the antenna rotation program 148 when present antenna position coincides with the desired antenna position.

If in step 140 the program determines that antenna present position does not coincide with desired position, the program next resets the 8 second timer 150 and begins stepping the antenna toward the desired orientation 152. The desired antenna position is then provided to the display processor 154 and the antenna rotation program is exited 156.

Figure 2B:
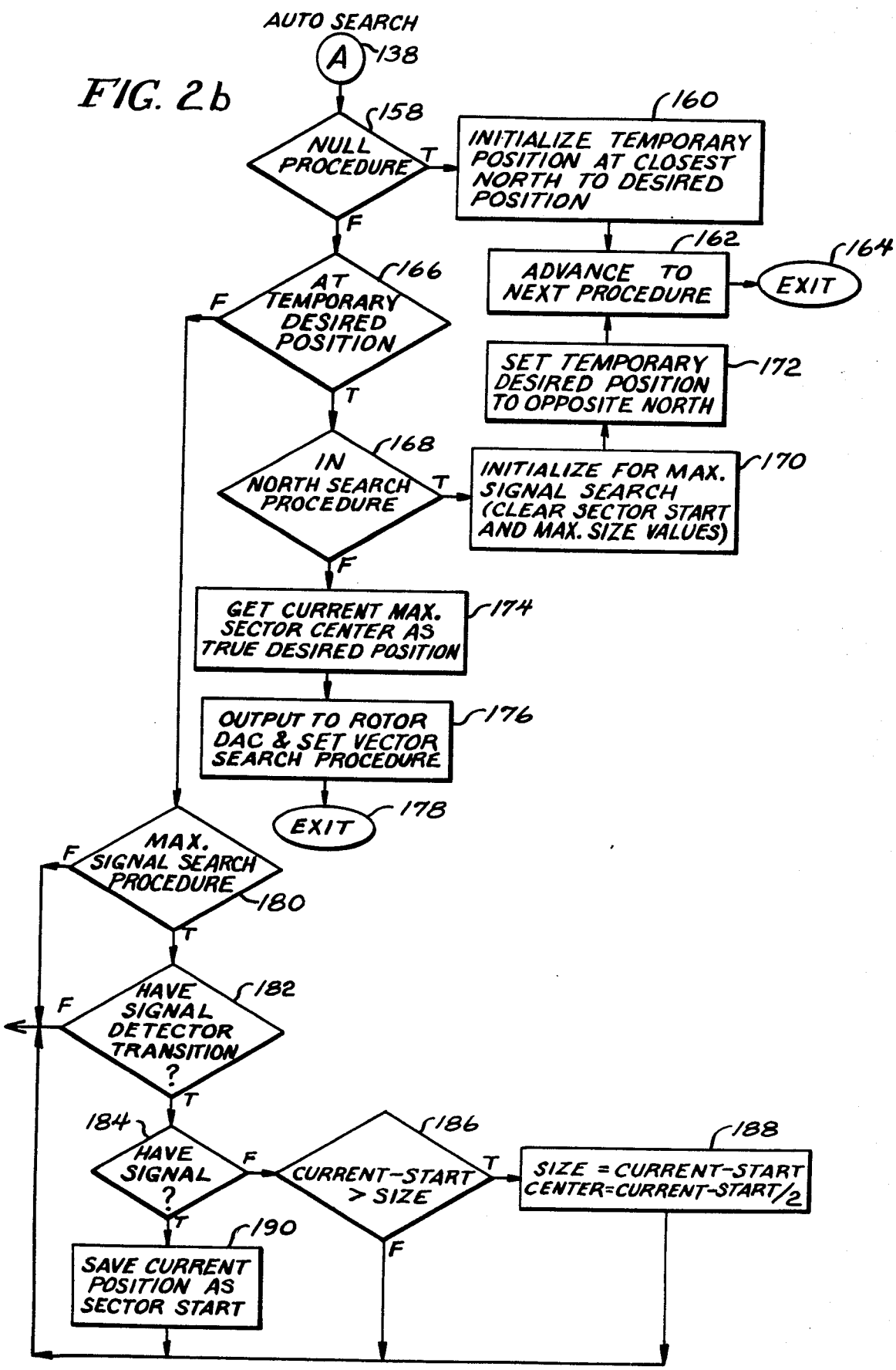

Following entry into the auto search routine 138, as shown in FIG 2b, a null procedure 158 is initiated wherein the system verifies that the antenna is initially pointing toward 0°. If the antenna is thus oriented, the auto search program is initialized at this temporary position 160 with the program advancing to the next procedure 162 and then exiting therefrom.

If the null procedure 158 discloses that the antenna is not pointing toward 0°, the antenna is oriented in a temporary desired position 166 and begins to search for antenna north direction 168. Once the antenna has been aligned northward, the program is initialized for maximum signal search 170, setting the temporary desired position to due south 172 and advances to the next procedure 162 in exiting the program 164. If the program earlier determines that the antenna is not oriented northward 168, the program determines the current sector start position 174 and provides an output to the rotor's DAC and begins a vector search procedure 176. The program is then exited 178 following execution of this routine.

If the program earlier determines that the antenna is not in the desired position 166, the program begins serching for the maximum strength signal 180 and once finding it 182 and 184, stores in memory its current position 190 and resets the timer 150 in stepping toward the desired position. If the system fails to detect a maximum strength received signal 184, it proceeds with an analysis of received signal strength in terms of search sector size 186, 188 and thence proceeds to reset the timer 150 in stepping toward the desired antenna position 152.

Shown in Table I are the preferred components and preferred values of various elements of the invention as illustrated in FIG. 1. The present invention, of course, is not limited to these specific values which are included for the purpose of disclosing the preferred embodiment of the present invention in the particular environment disclosed herein.

TABLE I

| ELEMENT | PREFERRED COMPONENT VALUE |
| --- | --- |
| Microprocessor 12 | Fairchild F3870 |
| Shift Register 14 | 14094 |
| Op Amp 18 | 442-22 |
| Resistor 20 | 10 Kilohms |
| Resistor 22 | 10 Kilohms |
| Resistor 24 | 11 Kilohms |
| Resistor 26 | 11 Kilohms |
| Comparator 28 | 442-21 |
| Comparator 30 | 442-21 |
| Resistor 38 | 82 Ohms |
| Resistor 46 | 10 Kilohms |
| Resistor 48 | 5600 Ohms |
| Capacitor 49 | 10 Microfarads |
| Resistor 50 | 5600 Ohms |
| Resistor 52 | 5600 Ohms |
| Resistor 54 | 3.3 Megohms |
| Resistor 56 | 10 Megohms |
| Resistor 58 | 3.3 Megohms |
| Resistor 60 | 10 Megohms |
| Resistor 62 | 3.3 Megohms |
| Resistor 64 | 3.3 Megohms |
| Resistor 72 | 10 Kilohms |
| Resistor 74 | 10 Kilohms |
| Resistor 76 | 10 Kilohms |
| Resistor 78 | 10 Kilohms |
| Resistor 84 | 210 Ohms |
| Capacitor 88 | 100 Microfarads |
| Resistor 90 | 210 Ohms |
| Capacitor 92 | 220 Microfarads |
| Resistor 102 | 4700 Ohms |
| Resistor 104 | 4700 Ohms |

There has thus been disclosed an automatic antenna positioning system for optimally positioning a rotary antenna. A microprocessor is used for storing the last position of maximum received signal strength for a given transmitted signal, comparing the present antenna position with the stored, or desired, position, rotating the antenna toward the desired position, and comparing received signal level with a predetermined threshold level in insuring coincidence of the main lobes of the transmitting and receiving antennas for maximum signal strength reception.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

I claim:

1. A system for positioning a rotary antenna driven by a voltage responsive rotor for use with a radio wave receiver having frequency selector means for selectively receiving signals from a plurality of predetermined stations, sand antenna positioning system comprising:

voltage sensing means coupled to said rotor and responsive to the position of said rotor for generating first signals representing current rotor position and second signals representative of antenna positions for receiving a signal greater than a predetermined threshold signal level from each of said plurality of predetermined stations;

signal processing means coupled to said voltage sensing means for storing said second signals representative of antenna positions for receiving signals greater than said predetermined threshold signal level from each of said plurality of predetermined stations;

position comparator means coupled to said rotor and to said signal processing means for recalling a second signal therefrom upon receiver turn-on or engagement of said selector means for receiving a signal from one of said predetermined stations and coupled to said voltage sensing means for comparing said first and second signals and for generating a third signal representing the difference between said first and second signals and for providing said third signal to said rotor for positioning said antenna to receive a signal greater than said predetermined threshold signal level from one of said plurality of predetermined stations; and signal comparator means coupled to said antenna for comparing received signal strength with a predetermined threshold signal level and coupled to said signal processing means for providing a continue command to said position comparator means if the received signal strength does not exceed said predetermined threshold signal level when said first and second signals are compared whereby antenna rotation continues until received signal strength exceeds said predetermined threshold signal level at a second antenna position and whereby said second antenna position is stored in said signal processing means as one of said second signals for subsequent use.

2. An antenna positioning system as set forth in claim 1 wherein said position comparator means comprises window comparator, said window comparator comprising first and second differential amplifiers, said differential amplifiers coupled to said signal processing means for receiving said second signals representative of the antenna positions for receiving maximum strength signals from each of said plurality of predetermined stations and coupled to said voltage sensing means for receiving said first signal representative of the present antenna position.

3. An antenna positioning system as set forth in claim 2 wherein said voltage sensing means includes a constant current source coupled to said first and second differential amplifiers of said window comparator and to said rotor whereby a signal representing the voltage applied to said rotor is provided to said first and second differential amplifiers for comparison with said second signal in said window comparator.

4. An antenna positioning system as in claim 1 wherein said first and second signals are continually compared at a predetermined rate and wherein said third signal is generated at said predetermined rate for incrementally rotating said antenna in a stepwise manner from its present position to a position for receiving a signal greater than said predetermined threshold signal level from one of said predetermined stations.

5. An antenna positioning system as set forth in claim 1 wherein said signal comparator means is coupled to threshold signal level generating means for comparing received signal strength with said predetermined threshold signal level and wherein said threshold signal level generating means is responsive to receiver operator inputs for selectively establishing said threshold signal level, with said threshold signal level defining a manually acceptable received signal.

6. An antenna postioning system as set forth in claim 5 wherein said signal comparator means includes a variable threshold signal comparator for receiving and comparing an intermediate frequency automatic gain control signal representing received signal strength with said threshold signal level.

7. An antenna positioning system as set forth in claim 1 wherein said rotor includes rheostat means for the operation thereof with the voltage applied across said rheostat means establishing the position of said antenna.

8. An antenna positioning system as in claim 1 wherein said radio wave receiver is a television receiver.

9. An antenna positioning system as in claim 1 wherein said radio wave receiver is a subscription television decoder.

10. A system for positioning a rotary antenna driven by a voltage responsive motor for use with a radio wave receiver having station selector means for selectively receiving signals from a plurality of transmitting stations, said antenna positioning system comprising:

a voltage source for providing a drive signal to said rotor wherein said rotor includes rheostat means coupled to said voltage source with the voltage applied across said rheostat means establishing the position of said antenna;

first means coupled to said antenna and responsive to the strength of the received signals induced therein for comparing received signal strength with a predetermined threshold signal level representing a minimally acceptable received signal strength and for generating a first signal when said received signal strength exceeds said predetermined threshold signal level;

second means coupled to said rotor and responsive to the voltage applied thereto for detecting the present position of said antenna and for generating a second signal representative thereof;

signal processing means coupled to said first and second means for receiving said first and second signals respectively therefrom and for generating and storing third signals representing a desired antenna position for each of said transmitting stations for receiving a signal greater than said predetermined threshold signal level therefrom; and position comparator means comprising a window comparator including first and second differential amplifiers coupled respectively to said signal processing means for receiving said third signals representative of antenna position for receiving a signal greater than said predetermined threshold signal level from a selected transmitting station and coupled to said second means for receiving said second signal representative of present antenna position, said window comparator having upper and lower limits representing a predetermined rotational angular displacement around the maximum received signal antenna position for comparing said second and third signals and for generating a fourth signal representing the difference between said second and third signals, and coupled to said rotor for providing said fourth signal thereto in positioning said antenna to receive a signal greater than said predetermined threshold signal level from one of said plurality of transmitting stations and wherein said position comparator means is responsive to receipt of said first signal by said signal processing means for terminating said fourth signal provided to said rotor when said antenna is within said predetermined rotational angular displacement around the antenna position for receiving a signal greater than said predetermined threshold signal level.

* * * * *